(12) United States Patent
Miura

(10) Patent No.: US 6,912,995 B2
(45) Date of Patent: Jul. 5, 2005

(54) CONTROL APPARATUS FOR INTERNAL COMBUSTION ENGINE

(75) Inventor: Hajime Miura, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/902,073

(22) Filed: Jul. 30, 2004

(65) Prior Publication Data

US 2005/0039723 A1 Feb. 24, 2005

(30) Foreign Application Priority Data

Aug. 22, 2003 (JP) ........................................ 2003-298358

(51) Int. Cl.[7] .............................. F02M 7/00; F01L 1/34
(52) U.S. Cl. ................. 123/435; 123/90.11; 123/90.15; 123/568.14
(58) Field of Search ............................. 123/435, 90.11, 123/90.15, 90.16, 568.14

(56) References Cited

U.S. PATENT DOCUMENTS 6,612,294 B2 * 9/2003 Hiraya et al. .......... 123/568.14
6,843,231 B1 * 1/2005 Duffy et al. ................ 123/435

FOREIGN PATENT DOCUMENTS

JP          9-203337 A     8/1997
JP          2002-89341 A   3/2002

* cited by examiner

Primary Examiner—Hai Huynh
(74) Attorney, Agent, or Firm—Foley & Lardner LLP (57) ABSTRACT

A control apparatus for an internal combustion engine having two cylinder groups and two variable valve control mechanisms provided to the respective cylinder groups, includes a detecting section that detects an incylinder pressure of each cylinder, a comparing section that makes a comparison between the two cylinder groups with respect to a combustion stability and a control section that varies valve lift characteristics of intake valves of one cylinder group which is larger in the average incylinder pressure than the other cylinder group in accordance with a result of comparison by the comparing section so as to make intake air quantities for the respective cylinder groups be equal to each other.

36 Claims, 8 Drawing Sheets

CONTROL APPARATUS FOR INTERNAL COMBUSTION ENGINE

BACKGROUND OF THE INVENTION

The present invention relates to a control apparatus for an internal combustion engine.

A variable valve control mechanism capable of varying valve lift characteristics of an intake valve continuously is disclosed in Unexamined Japanese Patent Publication No. 2002-89341 which is assigned to the same assignee of this application. The variable valve control mechanism includes in combination an operation angle varying mechanism capable of varying an operation angle of an intake valve continuously and a phase varying mechanism capable of varying a maximum lift phase of an intake valve (i.e., the phase at which the lift of the intake valve becomes maximum).

Further, Unexamined Japanese Patent Publication No. 9-203337 discloses a technique for obviating a difference in air/fuel ratio between cylinders by detecting an air/fuel ratio of each cylinder through comparison between a time variation of a detection signal of an air/fuel ratio sensor and an exhaust timing of each cylinder and feedback correcting a fuel injection quantity independently of each cylinder.

SUMMARY OF THE INVENTION

In case the above-described variable valve control mechanism is used in a V-type internal combustion engine for variably controlling the valve lift characteristics of the intake valve, each bank (i.e., each cylinder group) is provided with the variable valve control mechanism. Thus, there is a possibility of causing a difference in the lift, operation angle and maximum lift phase of the intake valve between the banks due to an error in installation, variations inherent in parts of the variable valve control mechanism, etc., leading to deterioration in the performance efficiency, fuel consumption, exhaust emission, etc. of the engine.

Further, although the above-described Japanese Patent Publication No. 9-203337 discloses a feedback control of the air/fuel ratio that is conducted independently of each cylinder, it does not teach nothing about how to deal with the above-described difference in operation between the variable valve control mechanisms installed on the respective banks.

It is accordingly an object of the present invention to provide a control apparatus for an internal combustion engine which can effectively absorb a difference or variation in intake air quantity between cylinders due to an error in installation of the variable valve control mechanisms of respective cylinder groups and can suppress deterioration in performance efficiency, fuel consumption, exhaust emission, etc. of the engine.

To accomplish the above-described object, there is provided according to an aspect of the present invention a control apparatus for an internal combustion engine having two cylinder groups and two variable valve control mechanisms provided to the respective cylinder groups and capable of varying valve lift characteristics of intake valves and thereby varying an intake air quantity for each of the cylinder groups independently and continuously, comprising a detecting section that detects an incylinder pressure of each cylinder of the engine, a comparing section that compares a combustion stability of one of the two cylinder groups with a combustion stability of the other of the two cylinder groups when the engine is in an operating condition in which an intake valve opening timing and an exhaust valve closing timing overlap each other and an intake valve closing timing is set at a point prior to bottom dead center and when a difference in an average incylinder pressure between the two cylinder groups is larger than a predetermined value, and a control section that controls the variable valve control mechanisms in accordance with a result of comparison by the comparing section, the control section being configured to vary the valve lift characteristics of intake valves of one of the two cylinder groups which is larger in the average incylinder pressure than the other of the two cylinder groups so that intake air quantities for the respective cylinder groups become equal to each other.

According to another aspect of the present invention, there is provided a control apparatus for an internal combustion engine having two cylinder groups and two variable valve control mechanisms provided to the respective cylinder groups and capable of varying valve lift characteristics of intake valves and thereby varying an intake air quantity for each of the cylinder groups independently and continuously, comprising a detecting section that detects an incylinder pressure of each cylinder of the engine, a comparing section that compares a combustion stability of one of the two cylinder groups with a combustion stability of the other of the two cylinder groups when the engine is in an operating condition in which an intake valve opening timing and an exhaust valve closing timing overlap each other and an intake valve closing timing is set at a point prior to bottom dead center and when a difference in an average incylinder pressure between the two cylinder groups is larger than a predetermined value, and a control section that controls the variable valve control mechanisms, the control section being configured to perform a correction control for decreasing a lift and operation angle of intake valves of one of the two cylinder groups which is larger in an average incylinder pressure than the other of the two cylinder groups by a predetermined amount when it is determined by the comparing section that combustion in each cylinder of the one of the two cylinder groups at a predetermined cycle is more unstable than combustion in each cylinder of the other of the two cylinder groups at a predetermined cycle.

According to a further aspect of the present invention, there is provided a control apparatus for an internal combustion engine having two cylinder groups and two variable valve control mechanisms provided to the respective cylinder groups and capable of varying valve lift characteristics of intake valves and thereby varying an intake air quantity for each of the cylinder groups independently and continuously, comprising a detecting section that detects an incylinder pressure of each cylinder of the engine, a comparing section that compares a combustion stability of one of the two cylinder groups with a combustion stability of the other of the two cylinder groups when the engine is in an operating condition in which an intake valve opening timing and an exhaust valve closing timing overlap each other and an intake valve closing timing is set at a point prior to bottom dead center and when a difference in an average incylinder pressure between the two cylinder groups is larger than a predetermined value, and a control section that controls the variable valve control mechanisms, the control section being configured to perform a correction control for advancing a maximum lift phase of intake valves of one of the two cylinder groups which is larger in an average incylinder pressure than the other of the two cylinder groups by a predetermined amount when it is determined by the comparing section that combustion in each cylinder of the one of the two cylinder groups at a predetermined cycle is more unstable than combustion in each cylinder of the other of the two cylinder groups at a predetermined cycle.

According to a further aspect of the present invention, there is provided a control apparatus for an internal combustion engine having two cylinder groups and two variable valve control mechanisms provided to the respective cylinder groups and capable of varying valve lift characteristics of intake valves and thereby varying an intake air quantity for each of the cylinder groups independently and continuously, comprising a detecting section that detects an incylinder pressure of each cylinder of the engine, a comparing section that compares a combustion stability of one of the two cylinder groups with a combustion stability of the other of the two cylinder groups when the engine is in an operating condition in which an intake valve opening timing and an exhaust valve closing timing overlap each other and an intake valve closing timing is set at a point prior to bottom dead center and when a difference in an average incylinder pressure between the two cylinder groups is larger than a predetermined value, and a control section that controls the variable valve control mechanisms, the control section being configured to perform a correction control for decreasing a lift and operation angle of intake valves of one of the two cylinder groups which is larger in an average incylinder pressure than the other of the two cylinder groups by a predetermined amount when it is determined by the combustion stability comparing section that combustion in each cylinder of the one of the two cylinder groups at a predetermined cycle is more unstable than combustion in each cylinder of the other of the two cylinder groups at a predetermined cycle, the control section being further configured to perform a correction control for advancing a maximum lift phase of intake valves of one of the two cylinder groups which is larger in an average incylinder pressure than the other of the two cylinder groups by a predetermined amount when it is determined by the comparing section that combustion in each cylinder of the one of the two cylinder groups at a predetermined cycle is more unstable than combustion in each cylinder of the other of the two cylinder groups at a predetermined cycle.

DESCRIPTION OF THE PREFERRED EMBODIMENT

Figure 1:
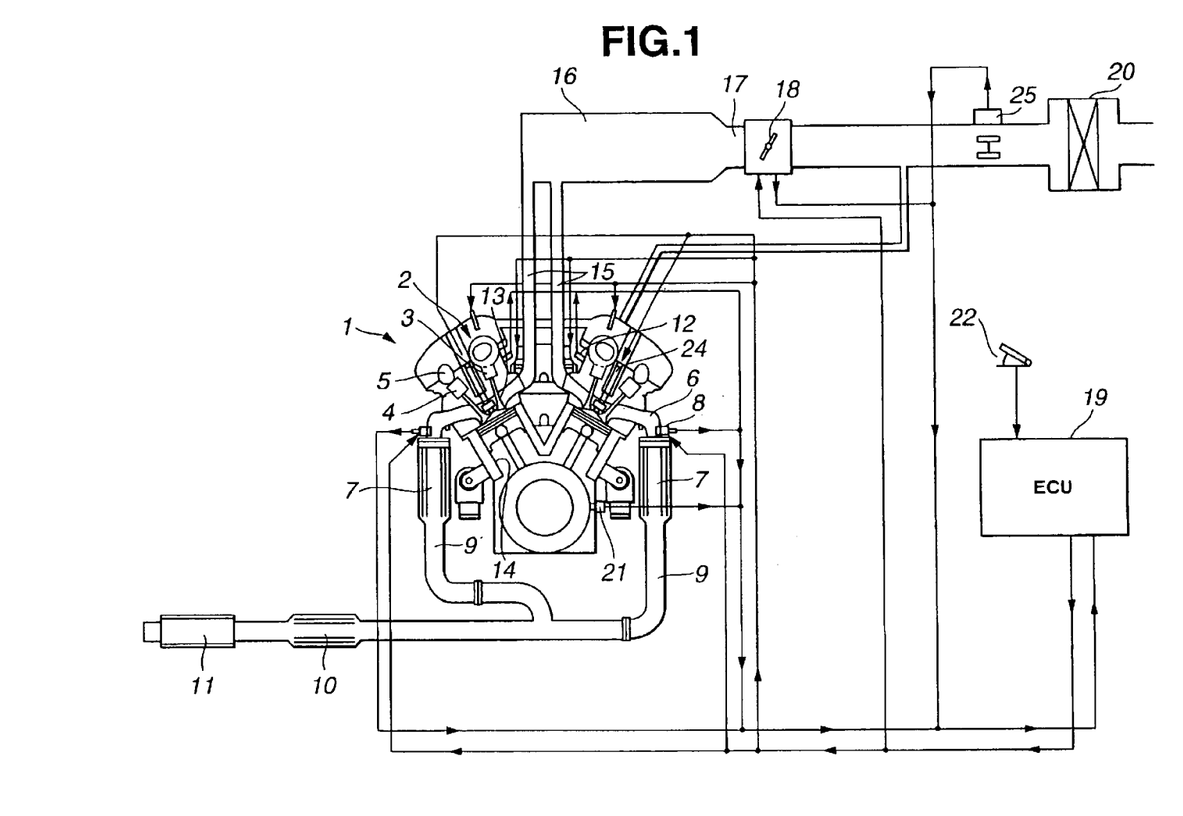
FIG. 1 is a schematic view of a control apparatus for a V-type internal combustion engine according to the present invention.

Referring first to FIG. 1, a V-type 6-cylinder gasoline engine is generally indicated by 1 and includes variable valve control mechanisms 2 disposed at respective banks (i.e., respective cylinder groups) for controlling valve timings of intake valve 3 separately at the respective banks. Engine 1 also includes valve operating mechanisms (no numeral) disposed at the respective banks for operating exhaust valves 4. The valve operating mechanisms for exhaust valves 4 are of the direct-drive type so as to drive exhaust valves 4 directly by exhaust camshafts 5 and therefore has valve lift characteristics that are always constant.

Exhaust manifolds 6 for the respective banks are connected to catalytic converters 7. Upstream of catalytic converters 7 are disposed air/fuel ratio sensors 8 for detecting the air/fuel ratio of the exhaust gas. Exhaust passages 9 for the respective banks are joined at the downstream sides of catalytic converters 7 to form a single passage that is provided with second catalytic converter 10 and silencer 11 at the downstream portion thereof.

To intake port 13 of each cylinder 14 is connected branch passage 15. Six branch passages 15 are connected at upstream ends thereof to collector 16. To an end of collector 16 is connected intake inlet passage 17 to which is provided electronically controlled throttle valve 18. Electronically controlled throttle valve 18 is provided with an actuator (not shown) made up of an electric motor so that its opening degree is controlled in response to a control signal supplied thereto from engine control unit 19. In the meantime, electronically controlled throttle valve 18 is provided with a sensor (not shown) for detecting an actual opening degree of throttle valve 18 as an integral unit, and on the basis of a detection signal of the sensor a throttle valve opening degree is closed-loop controlled to a target opening degree. Further, upstream of throttle valve 18 is disposed airflow meter 25 for detecting an intake air quantity, and upstream of air flow meter 25 is disposed air cleaner 20.

Further, to a crank shaft (no numeral) is provided crank angle sensor 21 for detecting an engine speed and a crank angle position. In this embodiment, from a detection signal of crank angle sensor 21 is calculated a variation of angular velocity of the crankshaft, i.e., a fluctuation of rotation of the crankshaft, and from the fluctuation of rotation is detected an incylinder pressure of a cylinder in expansion stroke. Namely, crank angle sensor 21 and a section in engine control unit 19 for executing calculation of the incylinder pressure constitute a detecting section for detecting the incylinder pressure. Further, accelerator opening degree sensor 22 is provided for detecting an opening degree (depression amount) of an accelerator pedal (no numeral) operated by a vehicle driver. Those detection signals are inputted to engine control unit 19 together with the detection signals of airflow meter 25 and air/fuel ratio sensors 8. Based on those detection signals, engine control unit 19 controls fuel injection quantities and injection timings of fuel injectors 12, ignition timings of spark plugs 24, valve-lift characteristics of variable valve control mechanisms 2, an opening degree of throttle valve 18, etc.

Figure 2:
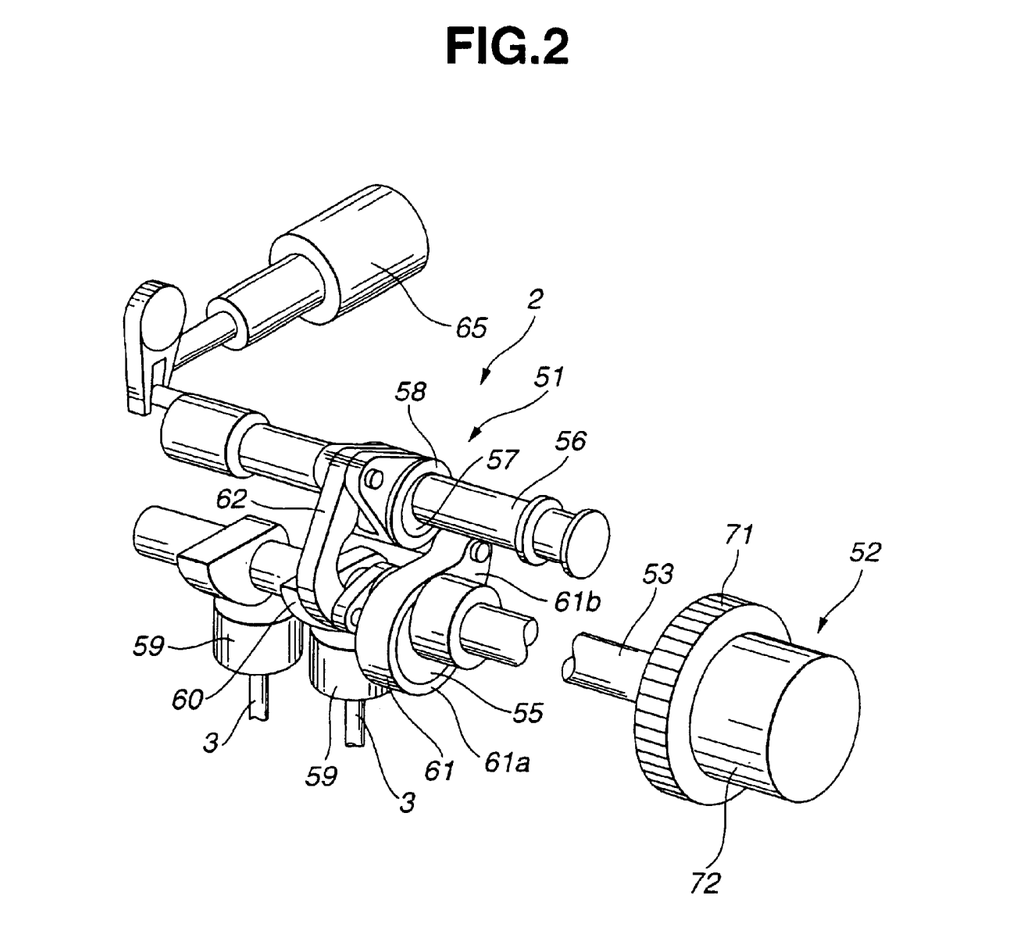
FIG. 2 is a perspective view of a lift and operation angle varying mechanism utilized in the engine of FIG. 1.

Variable valve control mechanism 2 on the intake valve 3 side is known as disclosed in Unexamined Japanese Patent Publication No. 2002-89341 and constituted, as shown in FIG. 2, by a combination of lift and operation angle varying mechanism 51 that varies the lift and operation angle of intake valve 3 continuously and phase control mechanism 52 that varies, i.e., advances or retards the maximum lift phase (phase relative to crankshaft) of intake valve 3 continuously variable valve control mechanism 2 of such a combination makes it possible to control the intake valve opening timing and the intake valve closing timing independently and arbitrarily and at the same time decrease the valve lift (i.e., maximum lift) in a low load range thereby limiting the intake air quantity in accordance with the engine load. In the meantime, in an engine operating condition where the lift is large to some extent, the quantity of air drawn into a cylinder is determined depending upon opening and closing timings of intake valve 3. In contras to this, in an engine operating condition where the lift is sufficiently small, the quantity of air drawn into the cylinder is determined depending mainly upon the lift.

By making additional reference to FIG. 3, lift and operation angle varying mechanism 51 will be described briefly. Lift and operation angle control mechanism 51 includes hollow drive shaft 53 rotatably supported on cylinder head (no numeral) by cam brackets (not shown), eccentric cam 55 force-fitted or otherwise fixedly attached to drive shaft 53, control shaft 56 disposed above and in parallel with drive shaft 53 and rotatably supported on the cylinder head by the above described cam brackets, rocker arm 58 mounted on eccentric cam portion 57 of control shaft 56 for oscillation motion, and oscillation cam 60 engaging tappet 59 provided to an upper end portion of intake valve 3. Eccentric cam 55 and rocker arm 58 are operatively connected by pivotal link 61, and rocker arm 58 and oscillation cam 60 are operatively connected by connecting rod 62. Drive shaft 53 is driven by the crankshaft of engine 1 (refer to FIG. 1) by way of a timing chain or timing belt (not shown). Eccentric cam 55 has a circular external surface the center of which is offset from a rotational axis of drive shaft 53 by a predetermined amount. On the circular external surface is rotatably fitted or mounted annular base portion 61a of pivotal link 61. Rocker arm 58 is mounted at a central portion thereof on eccentric cam portion 57 and has an end portion to which protruded arm portion 61b of pivotal link 61 is pivotally connected and another end portion to which an upper end portion of connecting rod 62 is pivotally connected. Eccentric cam portion 57 has a geometric center that is offset from the rotational axis of control shaft 56 so that an axis of oscillation of rocker arm 58 varies depending upon a variation of a rotational position or phase of control shaft 56.

Oscillation cam 60 is rotatably mounted on drive shaft 53 and has laterally protruded end portion 60a to which a lower end portion of connecting link 62 is pivotally connected. Oscillation cam 60 has at its lower side thereof basic circular or dwell surface 64a and cam or lift surface 64b extending from basic circular surface 64a toward above-described end portion 60a so as to have a predetermined curved profile. Basic circular surface 64a and cam surface 64b are brought into engagement with the upper surface of tappet 59 in response to turn or oscillation of oscillation cam 60. Namely, basic circular surface 64a serves as a base circle area that regulates an amount of lift to zero. When oscillation cam 60 is turned or rotated to bring cam surface 64b serving as a lift or rise area into contact with tappet 19, there is caused a lift of intake valve 3 that increases gradually with further rotation of oscillation cam 60.

Control shaft 56 is constructed so as to be rotatable within a predetermined rotational angle range by being driven by lift and operation angle control actuator 65 installed on an end of control shaft 56.

The operation of lift and operation angle control mechanism 51 will now be described. Rotation of drive shaft 53 causes pivotal link 55 to move up and down by the operation of eccentric cam 55. This causes rocker arm 58 to oscillate thereby causing oscillation cam 60 to oscillate. Oscillating motion of oscillation cam 60 causes tappet 59 to move up and down thereby causing intake valve 3 to open and close.

In this connection, a variation of the rotational position or phase of control shaft 56 by actuator 65 causes a variation of the initial position of rocker arm 58 thereby causing a variation of the initial position of oscillation cam 20.

Figure 3A:
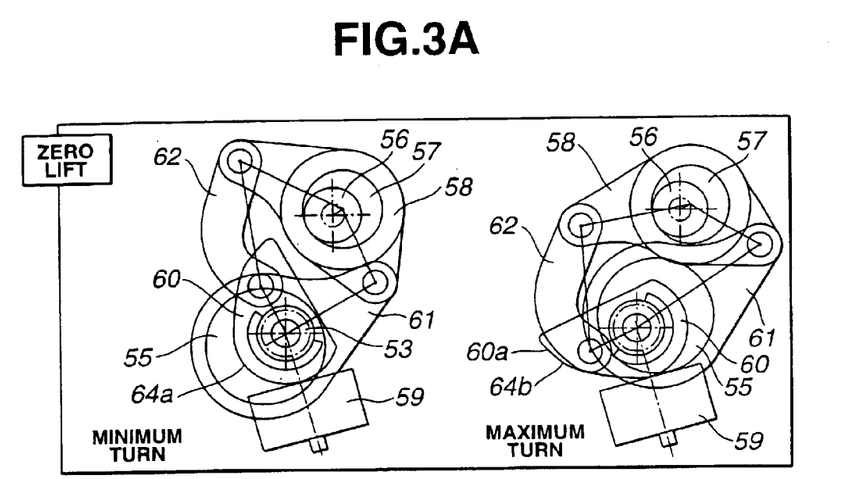
FIGS. 3A and 3B are schematic views for illustrating an operation of the lift and operation angle varying mechanism.

For example, when eccentric cam portion 57 is generally positioned in a higher place as shown in FIG. 3A, i.e., when the geometric center of eccentric cam portion 57 is located above the rotational axis of control shaft 56, rocker arm 58 is bodily moved into a higher place, thus causing end portion 60a of oscillation cam 60 to be moved into a higher position. Namely, when oscillation cam 60 is rotated into the initial position, cam surface 64b is caused to incline away from tappet 59. Accordingly, when oscillation cam 60 is caused to oscillate in response to rotation of drive shaft 53, basic circular surface 64a is brought into contact with tappet 59 for a longer period, whereas cam surface 64b is brought into contact with tappet 59 for a shorter period. Accordingly, the amount of lift is small, and an angular range from an opening timing to a closing timing, i.e., the operation angle is reduced.

Figure 3B:
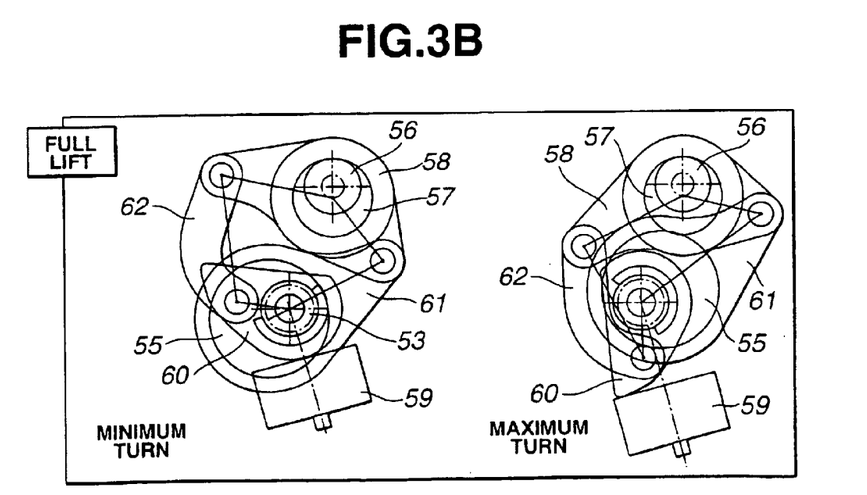

On the contrary, eccentric cam portion 57 is generally positioned in a lower place as shown in FIG. 3B, rocker arm 58 is bodily moved into a lower place, thus causing end portion 60a of oscillation cam 60 to move into a lower position. Namely, when oscillation cam 60 is rotated into the initial position, cam surface 24b is caused to incline toward tappet 59. Accordingly, when oscillation cam 60 oscillates in response to rotation of drive shaft 53, the place where oscillation cam 60 is brought into contact with tappet 59 changes immediately from basic circular surface 64a to cam surface 64b. Accordingly, the amount of lift becomes larger and the operation angle is enlarged.

Figure 4:
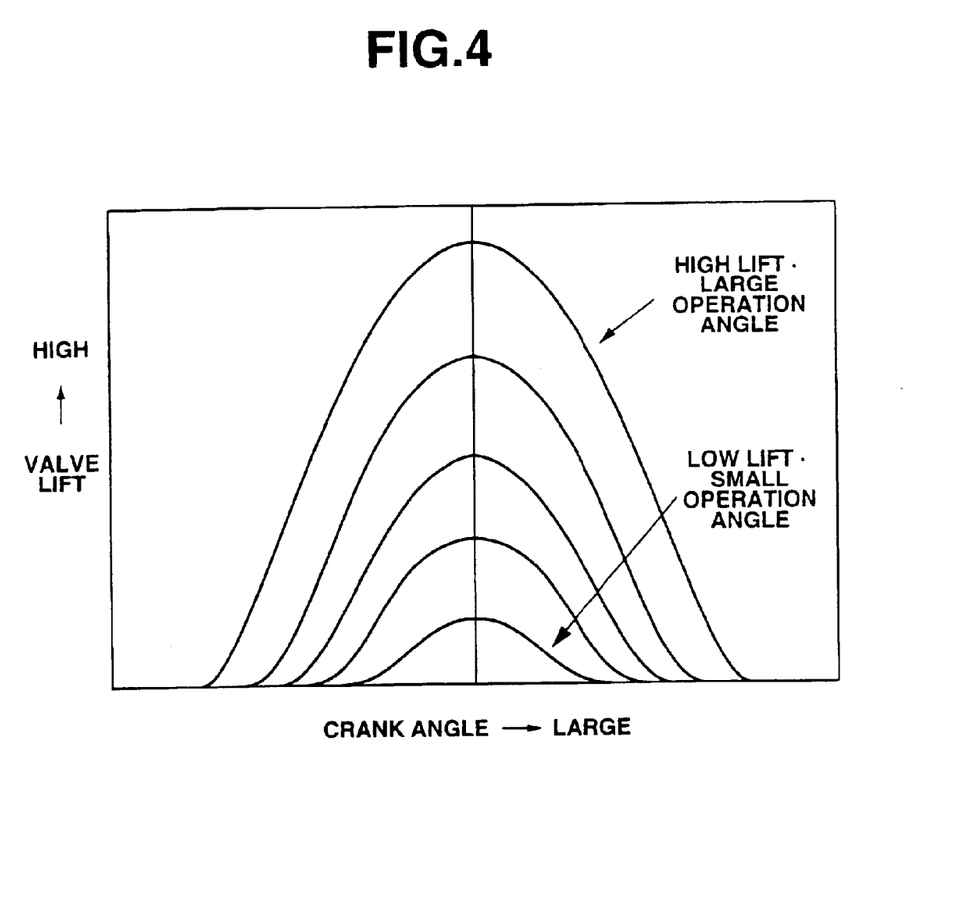
FIG. 4 is a view illustrating lift and operation angle variation characteristics of the lift and operation angle varying mechanism.

Since the position of eccentric cam portion 57 can be varied continuously, the lift and operation angle characteristics of intake valve 3 can be varied continuously as shown in FIG. 4. Namely, both of the lift and operation angle can be increased and decreased simultaneously and continuously. Particularly, by lift and operation angle control mechanism 51, the opening and closing timings are varied so as to be nearly symmetrical with respect to the maximum lift phase, in response to a variation of the lift and operation angle.

Figure 5:
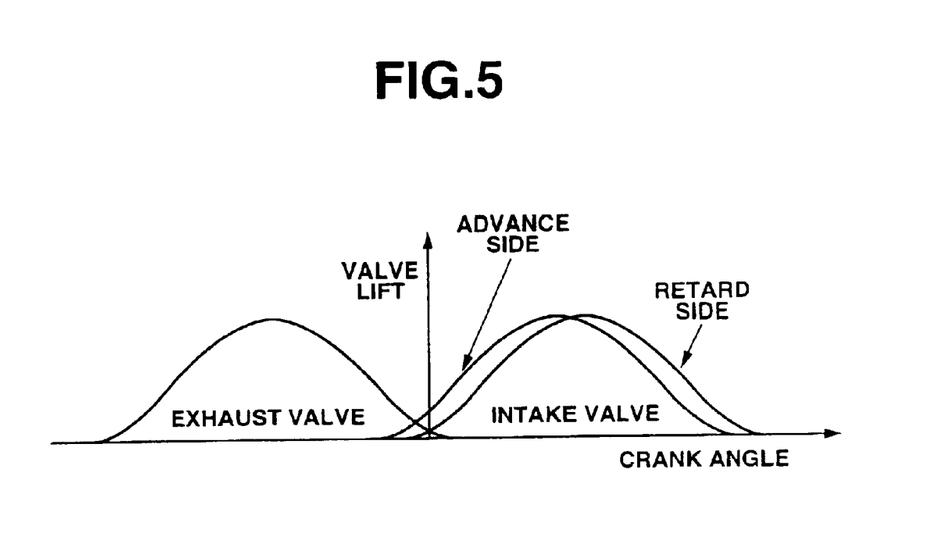
FIG. 5 is a view illustrating maximum lift phase variation characteristics of a phase varying mechanism utilized in the engine of FIG. 1.

As shown in FIG. 2, phase control mechanism 52 includes sprocket 71 provided to a front end portion of drive shaft 53, and hydraulic, phase control actuator 72 for rotating sprocket 71 relative to drive shaft 53 within a predetermined angular range. Sprocket 71 is drivingly connected to the crankshaft (not shown) by way of the timing chain or timing belt (not shown) so as to be rotatable in timed relation to the crankshaft. Supply of oil pressure to actuator 72 is controlled by second oil pressure controller 37 in response to a signal from engine control unit (ECU) 19. By the control of oil pressure to be supplied to actuator 72, sprocket 71 and drive shaft 53 are rotated relative to each other and the valve timing or phase is advanced or retarded as shown in FIG. 5. Namely, the curve representative of the valve lift characteristics does not change itself but is advanced or retarded in its entirety.

Lift and operation angle control mechanism 51 and phase control mechanism 52 can be open-loop controlled by using sensors (not shown) for detecting an actual lift, operation angle and maximum lift phase or can be simply closed-loop controlled in response to an engine operating condition.

By the above-described structure, an intake air quantity is controlled so as to attain a required torque that is determined by the accelerator opening degree. The opening degree of electronically controlled throttle valve 18 is basically controlled in such a manner that a minimum of vacuum necessary for exhaust gas recirculation or the like is produced within collector 16. Variable valve control mechanism 2 is controlled in such a manner that an optimum quantity of air flows into the cylinder under such an intake vacuum close to the atmospheric pressure.

Herein, in V-type gasoline engine 1, variable valve control mechanisms 2 are provided to the respective banks so that a difference in a lift and operation angle and maximum lift phase may possibly be caused between the banks due to an error in installation of variable valve control mechanisms 2 on the respective banks, variation in quality and installation of hydraulic, operation angle control actuators 65 on the respective banks, a variation in quality and installation of phase control actuator 72 on the respective banks, etc., causing deterioration in performance efficiency, fuel consumption, exhaust emission, etc. of the engine.

Figure 6:
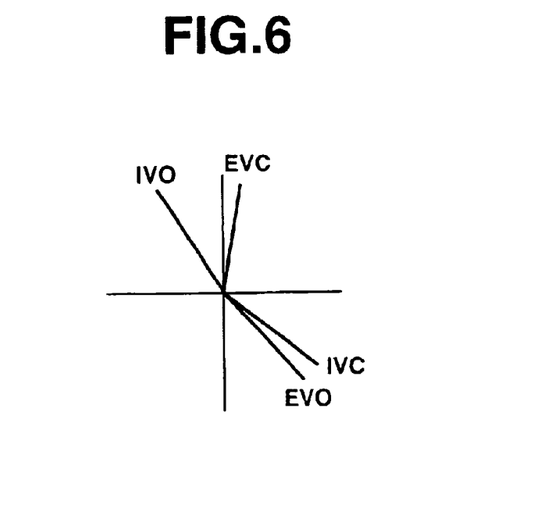
FIG. 6 is a schematic view showing an operating condition at which a correction control of a variable valve control mechanism is performed by the control apparatus of the present invention.

According to the present invention, it is performed a correction control for correcting a difference in the lift and operation angle and the maximum lift phase between the variable valve control mechanisms at the respective banks due to an error in installation of variable valve control mechanisms 2 thereby correcting the intake air quantities at the respective banks so as to make them become equal to each other at an engine operating condition where the intake valve opening timing (IVO) and the exhaust valve closing timing (EVC) overlap each other and the intake valve closing timing is set before bottom dead center, i.e., at an engine operating condition where a so-called early closing Miller cycle is attained as shown in FIG. 6. The reason why the correction control is performed at an engine operation condition as shown in FIG. 6 is that without relation to the engine rotational condition, etc., the more the intake valve closing timing (IVC) is retarded, the more the quantity of air supplied to the cylinder increases, and the more the intake valve closing timing (IVC) is advanced, the more the quantity of air supplied to the cylinder decreases.

Figure 7:
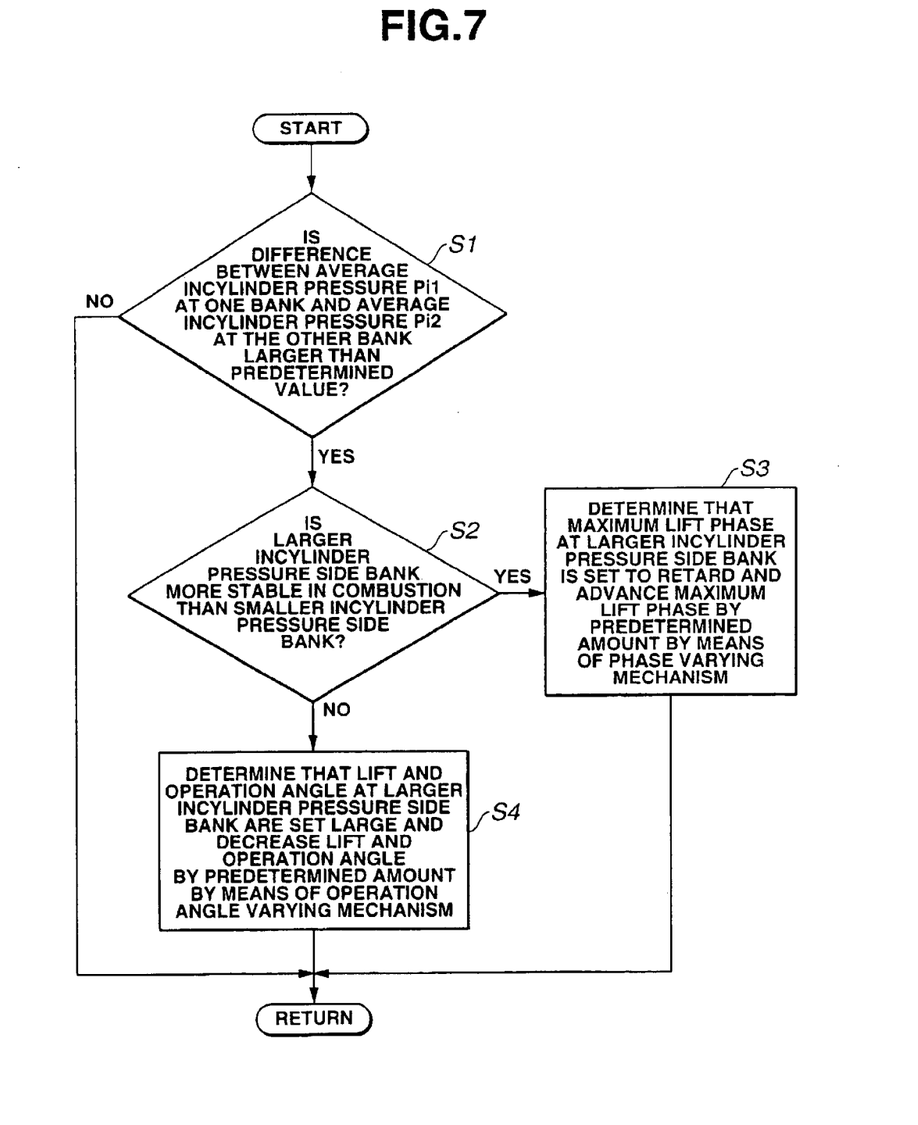
FIG. 7 is a flowchart showing a processing flow for a correction control of the variable valve control mechanism that is performed by the control apparatus of the present invention.

FIG. 7 shows a flowchart showing a processing flow of correcting a difference in the lift, operation angle and maximum lift phase between the banks at the above-described engine operating condition.

Figure 8:
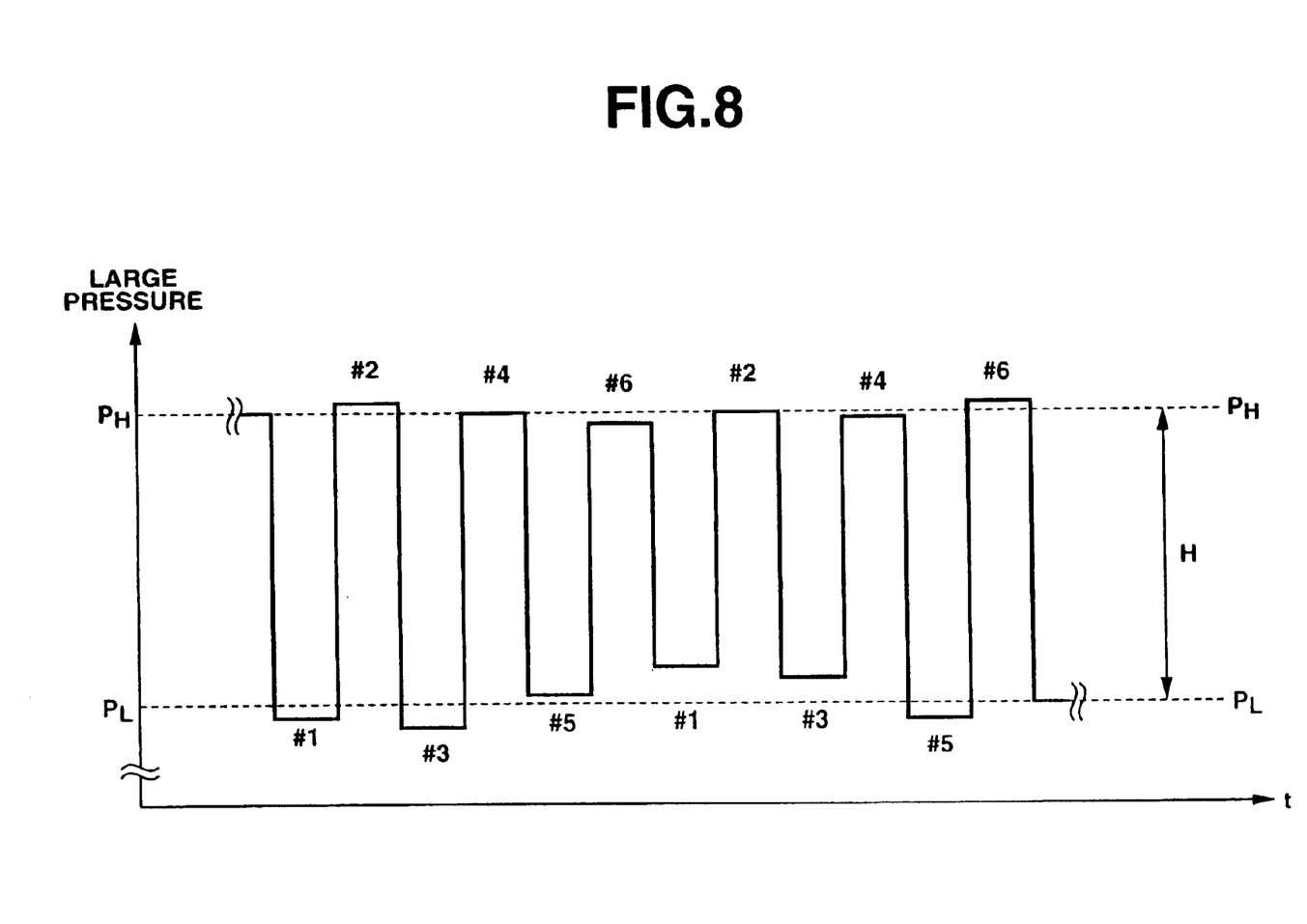
FIG. 8 is a schematic view showing a case in which an larger average incylinder pressure side bank is more stable in combustion than a smaller average incylinder pressure side bank.
Figure 9:
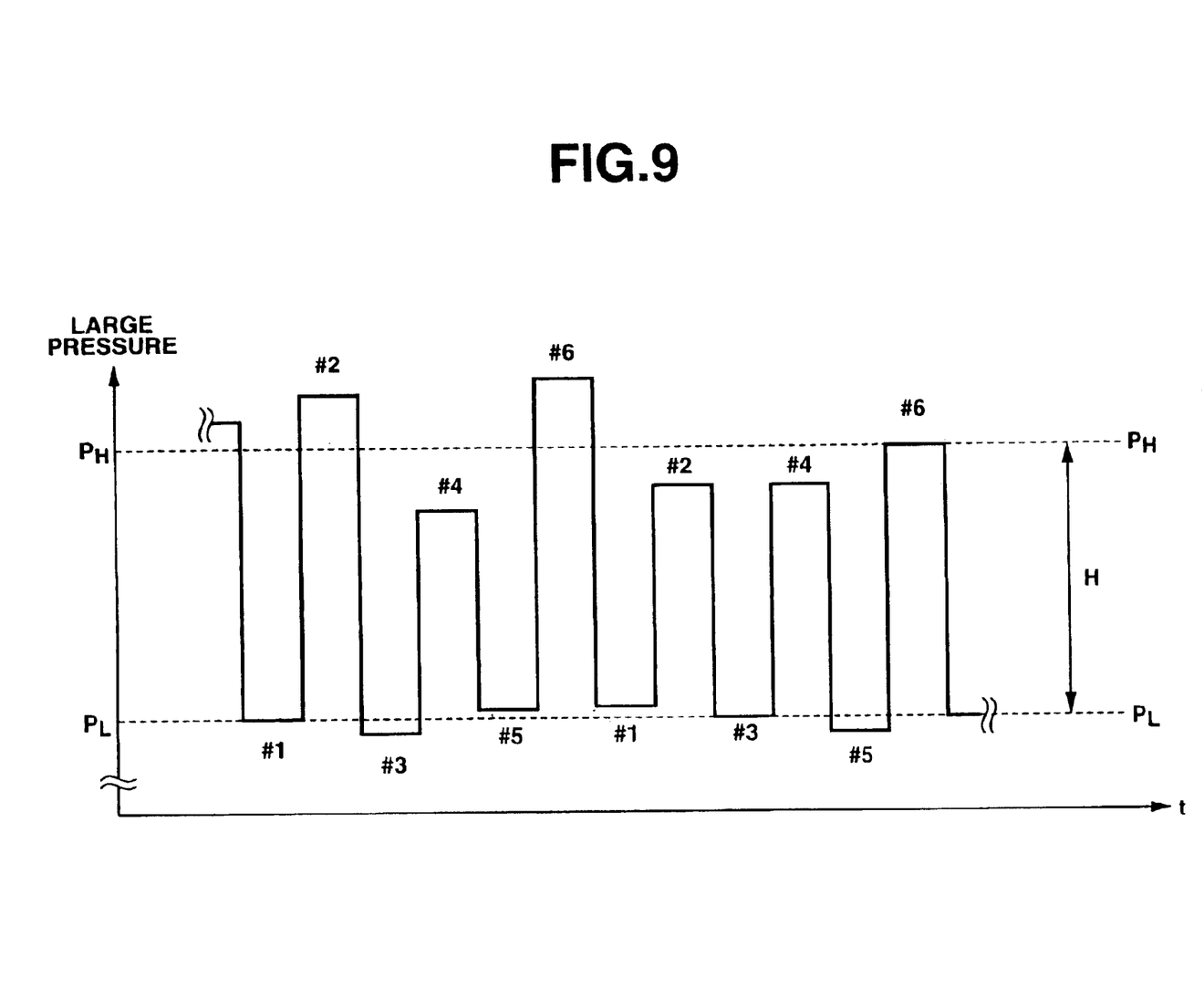
FIG. 9 is a schematic view showing a case in which a larger average incylinder pressure side bank is more unstable in combustion than a smaller average incylinder pressure side bank.

In step S1, average incylinder pressure Pi1 at one bank is compared with average incylinder pressure Pi2 at the other bank to determine whether or not the difference between Pi1 and Pi2 is larger than a predetermined value. If the difference between Pi1 and Pi2 is larger than the predetermined value, the processing goes to step S2. In the meantime, determination on whether or not the difference between Pi1 and Pi2 is larger than the predetermined value is specifically made by determining whether or not the difference H between average incylinder pressure $P_H$ at a larger average incylinder pressure side bank and average incylinder pressure $P_L$ at a smaller incylinder pressure side bank is larger than a predetermined value as shown in FIGS. 8 and 9 which will be described later. More specifically, the processing goes to step S2 only when the difference H between average incylinder pressure $P_H$ at the larger average incylinder pressure side bank and average incylinder pressure $P_L$ at the smaller incylinder pressure side bank is equal to or larger than 4 to 5%.

In step S2 that constitutes a combustion stability comparing means or section, it is determined whether or not combustion in the group of cylinders at the larger incylinder pressure side bank is more stable in comparison with combustion in the group of cylinders at the smaller incylinder pressure side bank, i.e., whether or not a variation of incylinder pressure between the cylinders at the larger average incylinder pressure side bank at a predetermined cycle is larger than that at the smaller average incylinder pressure side bank. In this connection, the larger average incylinder pressure side bank and the smaller incylinder pressure side bank are determined relatively based upon the magnitudes of the average incylinder pressures Pi1, Pi2.

FIGS. 8 and 9 show a case where combustion at the larger incylinder pressure side bank is more stable than combustion at the smaller incylinder pressure side bank and a case where combustion at the larger incylinder pressure side bank is more unstable than combustion at the smaller incylinder pressure side bank, respectively. For convenience, it is assumed that even-numbered cylinders #2, #4, #6 are disposed at the larger average incylinder pressure side bank and odd-numbered cylinders #1, #3, #5 are disposed at the smaller average incylinder pressure side bank.

If, as shown in FIG. 8, a variation of incylinder pressure at the larger average incylinder pressure side bank with respect to average incylinder pressure $P_H$ is not larger than that at the smaller average incylinder pressure side bank with respect to average incylinder pressure $P_L$ so that the larger average incylinder pressure side bank is equal in combustion to or more stable in combustion than the smaller average incylinder pressure side bank, the processing goes to step S3.

On the other hand, if, as shown in FIG. 9, a variation of incylinder pressure at the larger average incylinder pressure side bank with respect to average incylinder pressure $P_H$ is larger than that at the smaller average incylinder pressure side bank with respect to average incylinder pressure $P_L$ so that the larger average incylinder pressure side bank is not more stable in combustion than the smaller average incylinder pressure side bank, the processing goes to step S4.

Herein, more detailed description being made with respect to step S2, the determination on whether or not a variation of incylinder pressure at the larger incylinder pressure side bank with respect to average incylinder pressure $P_H$ is larger than that at the smaller incylinder pressure side bank with respect to average incylinder pressure $P_L$ is specifically made by calculating a standard deviation of incylinder pressure at the larger incylinder pressure side bank and a standard deviation of incylinder pressure at the smaller incylinder pressure side bank during predetermined cycles and determining that combustion at the larger average incylinder pressure side bank at a predetermined cycle is more unstable than combustion at the smaller average incylinder pressure side bank at a predetermined cycle when the standard deviation of incylinder pressure at the larger average incylinder pressure side bank is larger than the standard deviation of incylinder pressure at the smaller average incylinder pressure side bank.

In step S3, it is determined that the maximum lift phase of intake valve 3 at the larger average incylinder pressure side bank is set to retard, and the maximum lift phase of intake valve 3 at the larger average incylinder pressure side valve 3 is advanced by a predetermined amount while holding the lift and operation angle of intake valve 3 at the larger average incylinder pressure side bank unchanged. In other words, the maximum lift phase for intake valves 3 at the larger average incylinder pressure side bank is advanced a predetermined amount so that the intake air quantity for each cylinder at the larger average incylinder pressure side bank becomes equal to that at the smaller average incylinder pressure side bank. Such correction of the maximum lift phase in step S3 is based on the determination that combustion in each cylinder at the larger average incylinder pressure side bank is stable and not made unstable by an increase in the internal EGR ratio due to an increase in the overlap of the intake valve opening timing (IVO) and the exhaust valve closing timing (EVC). For this reason, the maximum lift phase is advanced for advancing the intake valve closing timing (IVC) so that the above-described pressure difference H decreases.

In step S4, the lift and operation angle for intake valves 3 at the larger average pressure side bank is determined to be large, and the lift and operation angle for intake valves 3 at the larger average incylinder pressure side bank is decreased by a predetermined amount so that the intake air quantity for the group of cylinders at the larger average incylinder pressure side bank becomes equal to that at the smaller average incylinder pressure side bank, while holding the maximum lift phase of intake valves 3 at the larger average incylinder pressure side bank unchanged and decreasing the lift and operation angle within a range capable of keeping an overlap between the intake valve opening timing (IVO) and the exhaust valve closing timing (EVC). In other words, the lift and operation angle of intake valves 3 at the larger average incylinder pressure side bank is decreased by a predetermined amount so that the intake air quantity at the larger average incylinder pressure becomes equal to that at the smaller average incylinder pressure side bank. Decrease correction of the lift and operation angle in step S4 is made, considering a possibility that the combustion at the larger average incylinder pressure side bank has been made unstable by an increase in the internal EGR ratio due to a large overlap between the intake valve opening timing (IVO) and the exhaust valve closing timing (EVC), with a view to decreasing the overlap of the intake valve opening timing (IVO) and the exhaust valve closing timing (EVC) thereby advancing the intake valve closing timing (IVC) so that the above-described pressure difference H decreases.

Herein, the correction amount for the advance correction of the maximum lift phase and the decrease correction of the lift and operation angle at the larger average incylinder pressure side bank in steps S3, S4 is determined so as to become larger as the intake valve closing timing (IVC) at the time of correction is closer to bottom dead center and as to become smaller as the intake valve closing timing (IVC) at the time of correction is closer to the crank angle or crank angle position at which the piston speed becomes maximum. This is due to the fact that the quantity of air is determined based upon the volume of the cylinder and the density of intake air at the time of the intake valve closing timing (IVC) so that a variation of the intake air quantity depending upon a variation of the intake valve closing timing (IVC) becomes larger as the intake valve closing timing (IVC) is closer to the crank angle or crank angle position at which the piston speed becomes maximum.

Further, the reason why the above-described correction control is made to the intake valves at the larger average incylinder pressure side bank is that if an effort is made to make average incylinder pressure $P_L$ at the smaller average incylinder pressure be equal to average incylinder pressure $P_H$ at the larger average incylinder pressure side bank, there is a possibility that the intake air quantity is increased to deteriorate the fuel consumption and an increase in the lift and operation angle at the smaller average incylinder pressure side bank causes an increase in the valve overlap of the intake valve to deteriorate combustion.

As having been described above, in this embodiment, under an operating condition where the intake valve opening timing (IVO) and the exhaust valve closing timing (EVC) overlap each other and the intake valve closing timing (IVC) is set prior to bottom dead center, the lift and operation angle or the maximum lift phase at the larger average incylinder pressure side bank is corrected so as to cause the intake valve closing timing (IVC) to advance, thereby decreasing the average incylinder pressure $P_H$ at the larger average incylinder pressure side bank and decreasing the difference between the average incylinder pressure $P_H$ at the larger average incylinder pressure side bank and the average incylinder pressure $P_L$ at the smaller average incylinder pressure side bank.

Namely, the valve lift characteristics of the intake valves at the larger average incylinder pressure side banks are changed so that the difference in the intake air quantity between the banks due to an error in installation of variable valve control mechanisms 2 on the respective banks is eliminated, whereby to make it possible to prevent the performance efficiency, fuel consumption, exhaust emission, etc. of the engine from being deteriorated due to an error in installation of variable valve control mechanisms 2 on the respective banks.

In the meantime, in step S2 of the above-described embodiment, it will do to compare the maximum and minimum values of the incylinder pressure at the larger average incylinder pressure side bank with those at the smaller average incylinder pressure side bank at a predetermined cycle and determine that if the difference between the maximum and minimum values of the incylinder pressure at the larger average incylinder pressure side bank is larger than the difference between the maximum and minimum values of the incylinder pressure at the smaller average incylinder pressure side bank, combustion at the larger average incylinder pressure at a predetermined cycle is more unstable than that at the smaller average incylinder pressure side bank at a predetermined cycle. Further, it will do to observe a variable component of a particular frequency and determined that if a variation of the variable component of the particular frequency caused at the larger average incylinder pressure side bank is larger than that at the smaller average incylinder pressure side bank, combustion at the larger average incylinder pressure side bank is more unstable than that at the smaller incylinder pressure side bank.

Further, while in the above-described embodiment, a particular sensor is not additionally used but crank angle sensor 21 is used for detecting the incylinder pressure of each cylinder, a known washer type sensor adapted to be installed together with a spark plug or a piezoelectric sensor such as a piezo-type pressure sensor embedded in a wall of a combustion chamber may be provided to each cylinder to detect the incylinder pressure of each cylinder directly.

The entire contents of Japanese Patent Applications P2003-298358 (filed Aug. 22, 2003) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A control apparatus for an internal combustion engine having two cylinder groups and two variable valve control mechanisms provided to the respective cylinder groups and capable of varying valve lift characteristics of intake valves and thereby varying an intake air quantity for each of the cylinder groups independently and continuously, comprising:

a detecting section that detects an incylinder pressure of each cylinder of the engine;

a comparing section that compares a combustion stability of one of the two cylinder groups with a combustion stability of the other of the two cylinder groups when the engine is in an operating condition in which an intake valve opening timing and an exhaust valve closing timing overlap each other and an intake valve closing timing is set at a point prior to bottom dead center and when a difference in an average incylinder pressure between the two cylinder groups is larger than a predetermined value; and a control section that controls the variable valve control mechanisms in accordance with a result of comparison by the comparing section;

the control section being configured to vary the valve lift characteristics of intake valves of one of the two cylinder groups which is larger in the average incylinder pressure than the other of the two cylinder groups so that intake air quantities for the respective cylinder groups become equal to each other.

2. A control apparatus according to claim 1, wherein the comparing section is configured to determine whether or not the one of the two cylinder groups is more stable in combustion than the other of the two cylinder groups by using a standard deviation of an average incylinder pressure of the one of the two cylinder groups and a standard deviation of an average incylinder pressure of the other of the two cylinder groups during predetermined cycles.

3. A control apparatus according to claim 1, wherein the comparing section is configured to determine whether or not the one of the two cylinder groups is more stable in combustion than the other of the two cylinder groups by comparing a variation of a variable component of a particular frequency caused by the one of the two cylinder groups and a variation of a variable component of a particular frequency caused by the other of the two cylinder groups.

4. A control apparatus according to claim 1, wherein the comparing section is configured to determine whether or not the one of the two cylinder groups is more stable in combustion than the other of the two cylinder groups by comparing maximum and minimum values of incylinder pressures of the one of the two cylinder groups with maximum and minimum values of incylinder pressures of the other of the two cylinder groups during predetermined cycles.

5. A control apparatus according claim 1, wherein the detecting section comprises a piezoelectric sensor disposed at each cylinder.

6. A control apparatus according to claim 1, wherein the detecting section is configured to detect an incylinder pressure of each cylinder on the basis of a fluctuation of rotation of a crank shaft which is calculated by using a detection signal of a crank angle sensor that detects a rotational angle of the crank shaft.

7. A control apparatus according to claim 1, further comprising a fuel supply section that supplies fuel to each cylinder of the engine, an air/fuel ratio detecting section that is disposed at an exhaust system of each of the cylinder groups and a feedback control section that controls a quantity of fuel supplied by the fuel supply section so as to attain a target air/fuel ratio based on a detection signal of the air/fuel ratio detecting section.

8. A control apparatus for an internal combustion engine having two cylinder groups and two variable valve control mechanisms provided to the respective cylinder groups and capable of varying valve lift characteristics of intake valves and thereby varying an intake air quantity for each of the cylinder groups independently and continuously, comprising:

a detecting section that detects an incylinder pressure of each cylinder of the engine;

a comparing section that compares a combustion stability of one of the two cylinder groups with a combustion stability of the other of the two cylinder groups when the engine is in an operating condition in which an intake valve opening timing and an exhaust valve closing timing overlap each other and an intake valve closing timing is set at a point prior to bottom dead center and when a difference in an average incylinder pressure between the two cylinder groups is larger than a predetermined value; and a control section that controls the variable valve control mechanisms;

the control section being configured to perform a correction control for decreasing a lift and operation angle of intake valves of one of the two cylinder groups which is larger in an average incylinder pressure than the other of the two cylinder groups by a predetermined amount when it is determined by the comparing section that combustion in each cylinder of the one of the two cylinder groups at a predetermined cycle is more unstable than combustion in each cylinder of the other of the two cylinder groups at a predetermined cycle.

9. A control apparatus according to claim 8, wherein the control section is configured to perform the correction control by decreasing the lift and operation angle of the one of the two cylinder groups within a range in which the intake valve opening timing and the exhaust valve closing timing are held in an overlapped condition, while holding the maximum lift phase unchanged.

10. A control apparatus according to claim 8, wherein the control section is configured to perform the correction control in such a manner that an amount of decrease of the lift and operation angle of the intake valves is made larger as the intake valve closing timing is located closer to bottom dead center and made smaller as the intake valve closing timing is located closer to a crank angle at which a piston speed becomes maximum.

11. A control apparatus according to claim 8, wherein the comparing section is configured to determine whether or not the one of the two cylinder groups is more stable in combustion than the other of the two cylinder groups by using a standard deviation of an average incylinder pressure of the one of the two cylinder groups and a standard deviation of an average incylinder pressure of the other of the two cylinder groups during predetermined cycles.

12. A control apparatus according to claim 8, wherein the comparing section is configured to determine whether or not the one of the two cylinder groups is more stable in combustion than the other of the two cylinder groups by comparing a variation of a variable component of a particular frequency caused by the one of the two cylinder groups and a variation of a variable component of a particular frequency caused by the other of the two cylinder groups.

13. A control apparatus according to claim 8, wherein the comparing section is configured to determine whether or not the one of the two cylinder groups is more stable in combustion than the other of the two cylinder groups by comparing maximum and minimum values of incylinder pressures of the one of the two cylinder groups with maximum and minimum values of incylinder pressures of the other of the two cylinder groups during predetermined cycles.

14. A control apparatus according claim 8, wherein the detecting section comprises a piezoelectric sensor disposed at each cylinder.

15. A control apparatus according to claim 8, wherein the detecting section is configured to detect an incylinder pressure of each cylinder on the basis of a fluctuation of rotation of a crank shaft which is calculated by using a detection signal of a crank angle sensor that detects a rotational angle of the crank shaft.

16. A control apparatus according to claim 8, further comprising a fuel supply section that supplies fuel to each cylinder of the engine, an air/fuel ratio detecting section that is disposed at an exhaust system of each of the cylinder groups and a feedback control section that controls a quantity of fuel supplied by the fuel supply section so as to attain a target air/fuel ratio based on a detection signal of the air/fuel ratio detecting section.

17. A control apparatus for an internal combustion engine having two cylinder groups and two variable valve control mechanisms provided to the respective cylinder groups and capable of varying valve lift characteristics of intake valves and thereby varying an intake air quantity for each of the cylinder groups independently and continuously, comprising:
 a detecting section that detects an incylinder pressure of each cylinder of the engine;
 a comparing section that compares a combustion stability of one of the two cylinder groups with a combustion stability of the other of the two cylinder groups when the engine is in an operating condition in which an intake valve opening timing and an exhaust valve closing timing overlap each other and an intake valve closing timing is set at a point prior to bottom dead center and when a difference in an average incylinder pressure between the two cylinder groups is larger than a predetermined value; and
 a control section that controls the variable valve control mechanisms;
 the control section being configured to perform a correction control for advancing a maximum lift phase of intake valves of one of the two cylinder groups which is larger in an average incylinder pressure than the other of the two cylinder groups by a predetermined amount when it is determined by the comparing section that combustion in each cylinder of the one of the two cylinder groups at a predetermined cycle is more unstable than combustion in each cylinder of the other of the two cylinder groups at a predetermined cycle.

18. A control apparatus according to claim 17, wherein the control section is configured to perform the correction control by advancing the maximum lift phase of intake valves of the one of the two cylinder groups while holding the lift and operation angle unchanged.

19. A control apparatus according to claim 17, wherein the control section is configured to perform the correction control in such a manner that an amount of advance of the maximum lift phase is made larger as the intake valve closing timing is located closer to bottom dead center and made smaller as the intake valve closing timing is located closer to a crank angle at which a piston speed becomes maximum.

20. A control apparatus according to claim 17, wherein the comparing section is configured to determine whether or not the one of the two cylinder groups is more stable in combustion than the other of the two cylinder groups by using a standard deviation of an average incylinder pressure of the one of the two cylinder groups and a standard deviation of an average incylinder pressure of the other of the two cylinder groups during predetermined cycles.

21. A control apparatus according to claim 17, wherein the comparing section is configured to determine whether or not the one of the two cylinder groups is more stable in combustion than the other of the two cylinder groups by comparing a variation of a variable component of a particular frequency caused by the one of the two cylinder groups and a variation of a variable component of a particular frequency caused by the other of the two cylinder groups.

22. A control apparatus according to claim 17, wherein the comparing section is configured to determine whether or not the one of the two cylinder groups is more stable in combustion than the other of the two cylinder groups by comparing maximum and minimum values of incylinder pressures of the one of the two cylinder groups with maximum and minimum values of incylinder pressures of the other of the two cylinder groups during predetermined cycles.

23. A control apparatus according claim 17, wherein the detecting section comprises a piezoelectric sensor disposed at each cylinder.

24. A control apparatus according to claim 17, wherein the detecting section is configured to detect an incylinder pressure of each cylinder on the basis of a fluctuation of rotation of a crank shaft which is calculated by using a detection signal of a crank angle sensor that detects a rotational angle of the crank shaft.

25. A control apparatus according to claim 17, further comprising a fuel supply section that supplies fuel to each cylinder of the engine, an air/fuel ratio detecting section that is disposed at an exhaust system of each of the cylinder groups and a feedback control section that controls a quantity of fuel supplied by the fuel supply section so as to attain a target air/fuel ratio based on a detection signal of the air/fuel ratio detecting section.

26. A control apparatus for an internal combustion engine having two cylinder groups and two variable valve control mechanisms provided to the respective cylinder groups and capable of varying valve lift characteristics of intake valves and thereby varying an intake air quantity for each of the cylinder groups independently and continuously, comprising:
 a detecting section that detects an incylinder pressure of each cylinder of the engine;
 a comparing section that compares a combustion stability of one of the two cylinder groups with a combustion stability of the other of the two cylinder groups when the engine is in an operating condition in which an intake valve opening timing and an exhaust valve closing timing overlap each other and an intake valve closing timing is set at a point prior to bottom dead center and when a difference in an average incylinder pressure between the two cylinder groups is larger than a predetermined value; and a control section that controls the variable valve control mechanisms;

the control section being configured to perform a lift and operation angle correction control for decreasing a lift and operation angle of intake valves of one of the two cylinder groups which is larger in an average incylinder pressure than the other of the two cylinder groups by a predetermined amount when it is determined by the combustion stability comparing section that combustion in each cylinder of the one of the two cylinder groups at a predetermined cycle is more unstable than combustion in each cylinder of the other of the two cylinder groups at a predetermined cycle;

the control section being further configured to perform a maximum lift phase correction control for advancing a maximum lift phase of intake valves of one of the two cylinder groups which is larger in an average incylinder pressure than the other of the two cylinder groups by a predetermined amount when it is determined by the comparing section that combustion in each cylinder of the one of the two cylinder groups at a predetermined cycle is more unstable than combustion in each cylinder of the other of the two cylinder groups at a predetermined cycle.

27. A control apparatus according to claim 26, wherein the control section is configured to perform the lift and operating angle decreasing correction control by decreasing the lift and operation angle of the one of the cylinder groups within a range in which the intake valve opening timing and the exhaust valve closing timing are held in an overlapped condition, while holding the maximum lift phase unchanged.

28. A control apparatus according to claim 26, wherein the control section is configured to perform the maximum lift phase correction control by advancing the maximum lift phase of intake valves of the one of the two cylinder groups while holding the lift and operation angle unchanged.

29. A control apparatus according to claim 26, wherein the control section is configured to perform the lift and operating angle decreasing correction control in such a manner that a decreasing amount of the lift and operation angle of the intake valves is made larger as the intake valve closing timing is located closer to bottom dead center and made smaller as the intake valve closing timing is located closer to a crank angle at which a piston speed becomes maximum.

30. A control apparatus according to claim 26, wherein the control section is configured to perform the maximum lift phase correction control in such a manner that an amount of advance of the maximum lift phase is made larger as the intake valve closing timing is located closer to bottom dead center and made smaller as the intake valve closing timing is located closer to a crank angle at which a piston speed becomes maximum.

31. A control apparatus according to claim 26, wherein the comparing section is configured to determine whether or not one of the two cylinder groups is more stable in combustion than the other of the two cylinder groups by using a standard deviation of an average incylinder pressure of the one of the two cylinder groups and a standard deviation of an average incylinder pressure of the other of the two cylinder groups during predetermined cycles.

32. A control apparatus according to claim 26, wherein the comparing section is configured to determine whether or not the one of the two cylinder groups is more stable in combustion than the other of the two cylinder groups by comparing a variation of a variable component of a particular frequency caused by the one of the two cylinder groups and a variation of a variable component of a particular frequency caused by the other of the two cylinder groups.

33. A control apparatus according to claim 26, wherein the comparing section is configured to determine whether or not the one of the two cylinder groups is more stable in combustion than the other of the two cylinder groups by comparing maximum and minimum values of incylinder pressures of the one of the two cylinder groups with maximum and minimum values of incylinder pressures of the other of the cylinder groups during predetermined cycles.

34. A control apparatus according claim 26, wherein the incylinder pressure detecting section comprises a piezoelectric sensor disposed at each cylinder.

35. A control apparatus according to claim 26, wherein the detecting section is configured to detect an incylinder pressure of each cylinder on the basis of a fluctuation of rotation a crank shaft which is calculated by using a detection signal of a crank angle sensor that detects a rotational angle of the crank shaft.

36. A control apparatus according to claim 26, further comprising a fuel supply section that supplies fuel to each cylinder, an air/fuel ratio detecting section that is disposed at an exhaust system of each of the cylinder groups and a feedback control section that controls a quantity of fuel supplied by the fuel supply section so as to attain a target air/fuel ratio based on a detection signal of the air/fuel ratio detecting section.

* * * * *